Figure 3:
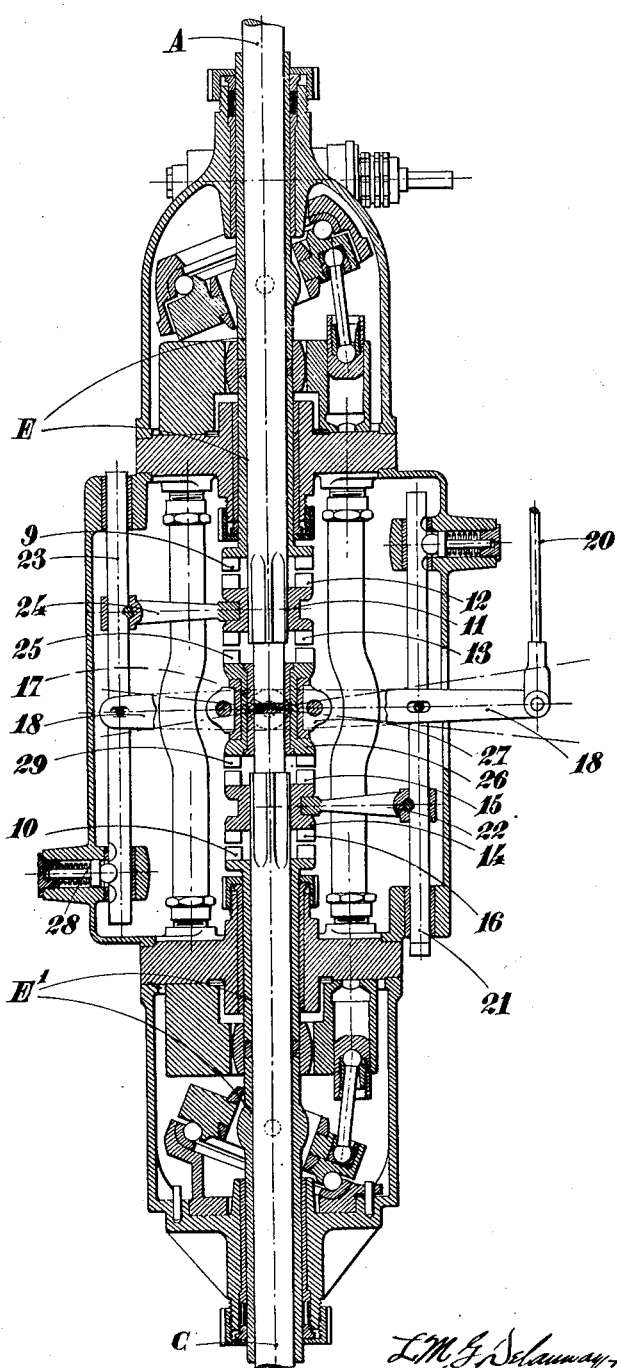

L. M. G. DELAUNAY-BELLEVILLE.
HYDRAULIC POWER TRANSMISSION MECHANISM.
APPLICATION FILED JUNE 12, 1911.
1,057,623.
Patented Apr. 1, 1913
2 SHEETS—SHEET 1.
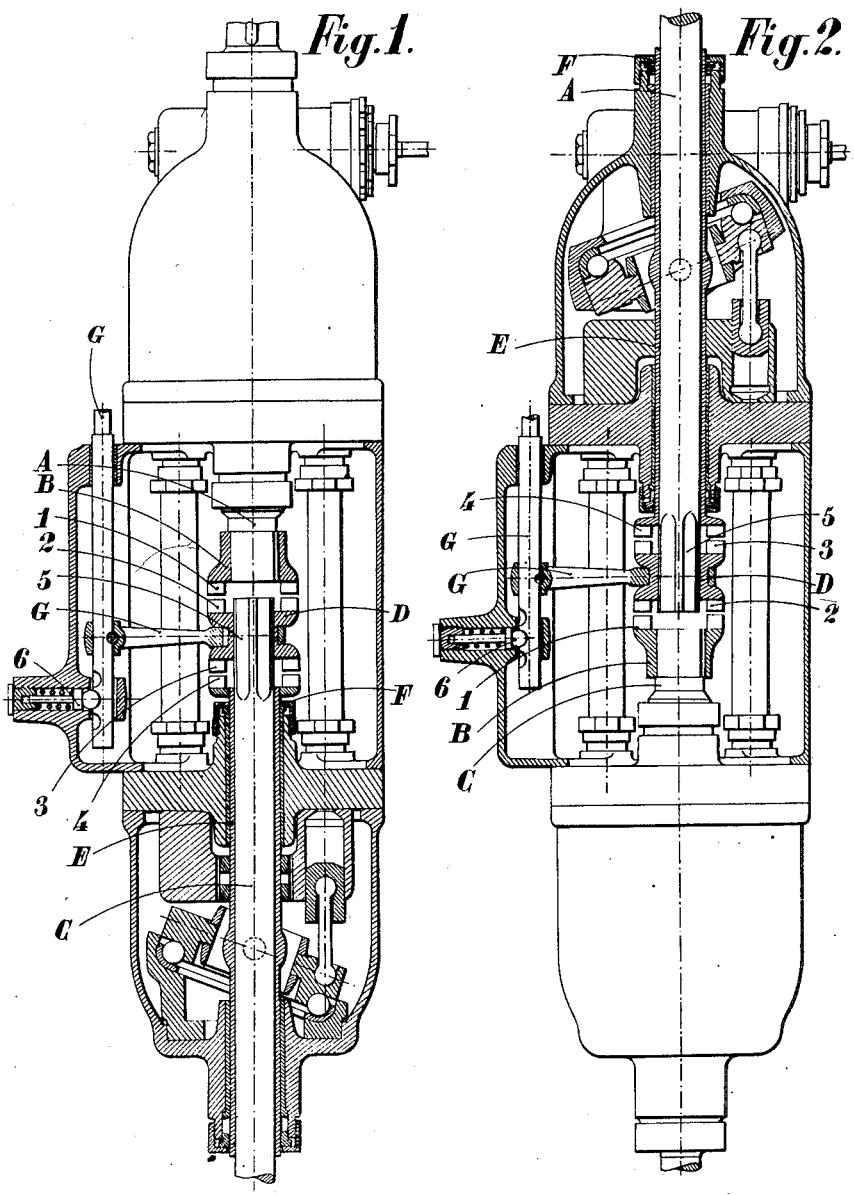

L. M. G. DELAUNAY-BELLEVILLE.
HYDRAULIC POWER TRANSMISSION MECHANISM.
APPLICATION FILED JUNE 12, 1911.

1,057,623.

Patented Apr. 1, 1913
2 SHEETS—SHEET 2.

UNITED STATES PATENT OFFICE.

LOUIS MARIE GABRIEL DELAUNAY-BELLEVILLE, OF PARIS, FRANCE, ASSIGNOR TO SOCIÉTÉ ANONYME DES AUTOMOBILES DELAUNAY-BELLEVILLE, OF ST.-DENIS, FRANCE, A CORPORATION OF FRANCE.

HYDRAULIC POWER-TRANSMISSION MECHANISM.

1,057,623.  Specification of Letters Patent.  Patented Apr. 1, 1913.

Application filed June 12, 1911. Serial No. 632,620.

*To all whom it may concern:*

Be it known that I, LOUIS MARIE GABRIEL DELAUNAY-BELLEVILLE, citizen of the French Republic, residing at Paris, Department of the Seine, France, have invented certain new and useful Improvements in and Relating to Hydraulic Power-Transmission Mechanism; and I do hereby declare the following to be a full, clear, and exact description of the invention, such as will enable others skilled in the art to which it appertains to make and use the same.

The present invention has for its object improvements in hydraulic change speed gears provided with a direct drive mechanism, such as that described in the prior application Ser. No. 617,166. In these devices the direct drive mechanism is situated external to the gear case and, in order to apply said drive, the suction conduit is placed in communication with the delivery conduit of the driving pumps. In accordance with the present invention the direct drive mechanism is located in the gear case and it is unnecessary to operate upon the pumps in order to render it operative. This novel mechanism is represented in the accompanying drawing; it comprises clutch devices which permit to connect the driving and driven shafts either with each other or with the driving and driven pumps respectively.

In the accompanying drawings: Figure 1 illustrates a device with a clutch on the driven shaft. Fig. 2 illustrates a modification where the clutch is situated upon the driving shaft. The Fig. 3 shows a change speed gear where two clutches are used, one on the driving shaft, one on the driven shaft.

In the drawings A designates the driving shaft, and C the driven shaft.

In the case illustrated in Fig. 1 the driven shaft ends in a square 5 carrying the sliding sleeve D which is furnished on both of its faces with clutch teeth 2 and 3. The driving shaft A carries a plate B provided with teeth 1 with which the teeth 2 on the sleeve D are able to engage. The driven shaft C is surrounded by a tube E which is driven by the driven pumps. The sleeve E is freely mounted upon the shaft C and carries teeth 4 that can be driven by the teeth 3 of the sleeve D. The axial movement of the sleeve E is limited by a stop F. The sleeve D is connected with an operating rod G which enables it to be shifted longitudinally along the square 5. This rod comprises a stop device 6.

The operation of the apparatus is as follows: If the sleeve D be displaced in such a manner as to engage the teeth 3 and 4 the pumps of the driven system which act upon the sleeve E drive through this sleeve the driven shaft C and the power is transmitted by the intermediary of the liquid. If the teeth 1 and 2 be engaged and the teeth 3 and 4 disengaged the driving shaft A will drive the shaft C directly by means of the sleeve D. The sleeve E is not then in engagement with the shaft C but is able to rotate freely around this shaft under the influence of the driven pumps which no longer transmit any useful work.

In Fig. 2 the square end 5 of the driving shaft A carries the sliding sleeve D furnished with teeth 2, 2 and 3, 3; the driven shaft C ends in a plate B carrying teeth 1, at its extremity a sleeve E surrounds the driving shaft A upon which it is able to rotate freely. The lower extremity of this sleeve E carries the teeth 4, 4. This sleeve is retained by a stop F which prevents its axial displacement and it is connected with the driving pumps. G is the rod and lever for operating the sleeve D. Fig. 2 shows the unclutched position. When the teeth 3 and 4 are engaged the driving shaft A rotates the sleeve E which drives the driving pumps; the driven pumps act directly upon the driven shaft C and the movement is transmitted by the intermediary of the liquid. On engaging the teeth 1 and 2, and disengaging the teeth 3 and 4 from the sleeve E so that it longer acts upon the driving pumps, the shaft C is driven directly by the driving shaft A.

The Fig. 3 shows a device in which each shaft may be coupled with the corresponding set of pumps or separated from the same. The driving shaft A and the driven shaft C are surrounded by tubes E and E¹ which participate in the rotation of the driving and driven pumps. The shaft A carries a sleeve 11 which is able to slide on its axis and is provided with teeth 12 and 13 on both sides. The teeth 12 may engage with teeth 9 on the tube E. The teeth 13 are able to engage with the teeth 25 of a sleeve 26 which is mounted in a bearing 27, but is not able to have any longitudinal translation. The sleeve 11 is actuated by a fork 24 solid with a rod 23 which may receive three positions and is maintained in each position by a locking device 28. The rod is pivoted to a lever 18 journaled in 17 and actuated by an actuating rod 20. The driven shaft C carries likewise a sleeve 14 the teeth 15 of which may engage with teeth 29 of sleeve 26 the teeth 16 being able to engage with the teeth 10 of the tube $E^1$. The sleeve 14 is actuated by means of a fork 22 solid with a rod 21 which is pivoted on the lever 18 opposite to the rod 23.

The operation of the mechanism is as follows: When the lever 18 is in the middle position, as in the case of the Fig. 3, the sleeves 11 and 14 are in engagement neither with the central sleeve 26 nor with the tubes E and $E^1$. The shaft C is unclutched. If the rod 20 is pushed downward, the lever 18 pushes the rods 21 and 23 in opposite directions, engaging the teeth 12 with the teeth 9 and the teeth 16 with the teeth 10. The motor shaft A is connected with the tube E while the shaft C is connected with $E^1$. The shaft A rotates integrally with the driving pumps, these force the liquid in the driven pumps, which on their turn actuate the shaft C. It is the normal operation with hydraulic transmission. If the rod 20 is on the contrary pulled upward the sleeves 11 and 14 are separated from the tubes E and $E^1$ and engaged with the teeth 25 and 29 of the central sleeve 26. The shaft C is driven directly by the shaft A, and the sets of pumps remain stationary.

I claim:

1. A hydraulic power transmission mechanism comprising driving and driven shafts, transmission mechanism associated with said shafts adapted to transmit motion from one shaft to the other, said mechanism comprising driving and driven pumps associated with the respective shafts and co-axially disposed with respect thereto, a sleeve rotatably mounted on one of said shafts and independent of but operatively connected to one of said pumps, and means adapted in one position to connect the shafts directly and in another position to connect the shaft with the sleeve which it carries whereby motion is transmitted from one shaft to the other through the intermediary of the pumps and the said sleeve.

2. In a hydraulic transmission, mechanism, a driving shaft, a driven shaft, sleeves rotatably mounted on said shafts, means adapted to operatively connect each of said shafts with the corresponding sleeve or to connect the shafts directly, and hydraulic connections between said sleeves, comprising driving and driven pumps coaxially disposed with respect to said sleeves.

3. In a hydraulic transmission mechanism, a driving shaft, a driven shaft, sleeves provided with clutch teeth rotatably mounted on said shafts, hydraulic connections between said sleeves comprising driving and driven pumps co-axially disposed with respect to said sleeves, clutch mechanism associated with the shafts adapted in one position to operatively connect the shafts directly and in another position to operatively connect each shaft with the sleeve mounted thereon.

In testimony whereof I affix my signature, in presence of two witnesses.

LOUIS MARIE GABRIEL
DELAUNAY-BELLEVILLE.

Witnesses:
H. C. COXE,
EMILE KLOTZ.